United States Patent [19]

Young

[11] Patent Number: 4,975,196

[45] Date of Patent: Dec. 4, 1990

[54] CYCLIC, MULTI-STAGE BIOLOGICAL PROCESS FOR WASTEWATER TREATMENT

[75] Inventor: James C. Young, Fayetteville, Ark.

[73] Assignee: Board of Trustees of the University of Arkansas, Little Rock, Ark.

[21] Appl. No.: 509,369

[22] Filed: Apr. 16, 1990

Related U.S. Application Data

[63] Continuation-in-part of Ser. No. 17,453, Feb. 24, 1987, abandoned, and a continuation of Ser. No. 273,625, Nov. 17, 1988, abandoned.

[51] Int. Cl.$^5$ ............................................... C02F 3/30
[52] U.S. Cl. ..................... 210/617; 210/614; 210/620; 210/142; 210/201
[58] Field of Search ............... 210/607, 614, 617, 620, 210/630, 903, 142, 199, 201, 253, 254

[56] References Cited

U.S. PATENT DOCUMENTS

| | | | |
|---|---|---|---|
| 3,442,386 | 5/1969 | Malm et al. | 210/142 |
| 3,497,066 | 2/1970 | Nicol | 210/220 |
| 3,524,547 | 8/1970 | Nicol | 210/220 |
| 3,977,965 | 8/1976 | Tholander et al. | 210/630 |
| 4,179,366 | 12/1979 | Kaelin | 210/620 |
| 4,624,788 | 11/1986 | Repin | 210/607 |

*Primary Examiner*—Tom Wyse
*Attorney, Agent, or Firm*—Hermann Ivester

[57] ABSTRACT

A method for anaerobic biological waste treatment in multiple stages wherein a relatively high strength wastewater is introduced into a first biological reactor to produce an effluent of reduced strength, the effluent is passed into a second biological reactor for reaction therein, passage of the effluent into the second biological reactor is continued until the biological solids in the second reactor enter into a negative growth phase and become relatively stable, whereupon the flow of waste through the reactors is reversed by terminating introduction of the waste into the first reactor and passing the same into the second reactor to cause microorganisms in the second reactor to enter into a positive growth phase and the solids in the first reactor to enter into a negative growth phase.

7 Claims, No Drawings

CYCLIC, MULTI-STAGE BIOLOGICAL PROCESS FOR WASTEWATER TREATMENT

RELATED APPLICATIONS

This application is a continuation-in-part of application Ser. No. 017,453 filed Feb. 24, 1987 and its continuation Ser. No. 273,625 filed Nov. 17, 1988, both now abandoned.

BACKGROUND OF THE INVENTION

1. Field of the Invention

The present invention is in the field of biological waste treatment in multiple stages utilizing periodic reversal of flow between the stages to secure improved efficiency.

2. Description of the Prior Art

Biological waste treatment systems rely on microorganisms to decompose organic materials. These microorganisms use the organic waste substances or substrates for growth and maintenance energy, thereby producing cell solids and various by-products and/or end products.

Generally, growth is considered to be related to the concentration of substrate by the Michaelis-Menten or Monod relationships as follows:

$$R_g = YR_s - k_d M_a \quad (1)$$

where:
$R_g$ = rate of cell growth, mass/time,
$Y$ = yield coefficient, mass per unit of substrate removal,
$k_d$ = decay coefficient per unit time,
$M$ = active microorganism mass,
and $$R_s = \frac{kSM_a}{K_s + S} \quad (2)$$

where:
$S$ = concentartion of substrate to be removed in mg/l,
$k$ = maximum substrate utilization rate, per unit time,
and
$K_s$ = half-velocity coefficient, mg/l.

Combining equations (1) and (2) gives:

$$R_g = Y\frac{kSM_a}{K_s + S} - k_d M_a \quad (3)$$

This equation shows that if a substrate is fed to an accumulated active microorganism mass, $M_a$, at a high concentration, $S$, the net rate of growth, $R_g$, will be positive and the active mass will increase. At some specific substrate concentration where $S=S_m$, the rate of growth will become zero. At substrate concentrations below $S_m$, the microorganism population will shift into a decay mode, and net growth will be negative, that is, the active mass will begin to decrease.

Normally, biological waste treatment systems are designed for operation where net growth is positive. As a result, microorganisms grow and produce an excess accumulation that must be wasted, this excess being commonly referred to as sludge. Typically, substrate removal efficiency improves as the net growth approaches zero. If attempts are made in a single reactor system to operate at substrate concentrations in the negative growth range, the accumulated solids decay to the point that the system fails. However, it is desirable to operate as close to the point of zero growth as possible to improve the waste treatment efficiency and to minimize the net amount of excess sludge produced.

In Apr. 1982, Bandy and Messenger published a paper in which they sought to increase the capacity of a rotating biological contactor to treat shock loads by periodically reversing the direction of flow across two or more stages of such a contactor. The purpose was to increase the total inventory of biofilm within several stages. There was no disclosure of operating under the conditions under which the present invention is carried out.

SUMMARY OF THE INVENTION

The present invention provides a method for biological waste treatment in multiple stages wherein a relatively high strength wastewater is introduced into a first biological reactor to produce an effluent of reduced strength, the effluent is passed into a second biological reactor, and passage of the effluent is continued into the second biological reactor until the biological solids therein enter into a negative growth phase and become relatively stable. Then, the flow of wastewater through the reactors is reversed by terminating introduction of the wastewater into the first reactor and passing the same into the second reactor to cause microorganisms in the second reactor to enter into a positive growth phase and the solids in the first reactor to enter a negative growth phase.

Preferably, the method is preceded by the balancing of the biological solids in the first and second stages so that they are substantially equal during start up.

The method of the present invention also may be accomplished by transferring biological solids from the first reactor in the flow path to the second reactor.

The apparatus used in the present invention consists of at least two reactors, both of which have biological solids therein, together with respective inlets and outlets together with means for periodically reversing the flow of effluent and wastewater between the first and second reactors, respectively.

BRIEF DESCRIPTION OF THE DRAWINGS

The single figure of the drawings illustrates somewhat schematically a flow diagram for carrying out the process of the present invention.

DESCRIPTION OF THE PREFERRED EMBODIMENTS

In the FIGURE, there are shown two biological treatment stages although it should be recognized that any number in excess of two could also be used to secure the benefits of the present invention.

In the FIGURE, reference numeral 10 has been used generally to identify a first biological reactor for the treatment of organic waste, the reactor 10 including suitable amounts of microorganisms for decomposing the organic materials. High strength wastewater is introduced through an inlet 11 through a pump 12 which directs the wastewater through a control valve 13 into the reactor 10.

The second reactor, identified as reference numeral 14, is similar in all respects to the first reactor 10 and contains the same type of microorganisms as in the first reactor 10. Periodically, relatively high strength wastewater is introduced into the second reactor 14 by means of the pump 12, the valve 13 then being closed, the introduction being by means of a valve 15.

Effluent from the first reactor 10 is withdrawn through a line 16 and, by means of a valve 17, is directed into the inlet of a pump 18. The discharge of the pump passes through a valve 19 and then enters into the reactor 14 by means of a line 20, as shown. Thus, the first reactor 10 and the second reactor 14 are operating in series. In this condition, the effluent from the second reactor is discharged through a line 21 and valve 22 to an outlet conduit 23 through the use of a pump 24.

During start up, suitable amounts of biological solids are distributed between reactors 10 and 14 somewhat uniformly, either by operating the units in parallel or by physically moving solids from one reactor to the other, or by injecting solids from outside sources. Alternatively, start up may be accomplished by using a non-uniform distribution of biological solids between reactors 10 and 14, for example, in a range of distribution from 90% in either reactor and 10% in the other, to equal amounts in either reactor, or any proportion intermediate thereto, but exercising this option may vary the time required to achieve full benefit of the cyclic, multi-stage process. After start up, the units are operated in series so that the high strength waste is added to the first reactor 10 of the series and the effluent from the first reactor 10 is passed through the second reactor 14. Biological growth will occur at a relatively high rate in the first reactor 10 as a result of the high substrate concentration in contact with the microorganisms. As the efficiency of the first reactor 10 increases, the solids in the second reactor 14 will enter into the decay or negative growth phase, yet they continue to remove substrate as long as active solids are present. The combination thereby provides a treatment efficiency which is beyond the level possible in a single stage unit having a reaction volume equal to the combined volume of reactors 10 and 14.

In accordance with the present invention, the flow of wastewater and effluent are cyclically and periodically reversed at least once during the treatment operation. After a period of time in series operation between reactor 10 and reactor 14, the biological solids in the reactor 14 are highly stable, that is, subject to little additional decay and may become less and less effective for substrate removal. At a time determined by solids activity and/or substrate removal in the second reactor 14, the order of the units is changed, that is, the second reactor 14 which was previously the "follow" unit becomes the first reactor or the "lead unit", and the previous first stage reactor becomes the second stage. This is accomplished by means of a control unit 25 which controls the actuation of the valves (all of which may be solenoid actuated) shown in the figure. The valves which are simultaneously actuated are connected by means of dashed lines in the drawing. Specifically, when the solids activity and/or substrate removal in reactor 14 reaches the appropriate level, the control 25 is actuated, closing valve 13 which terminates the inflow from the input 11. Simultaneously, the valve 17 is closed, thereby terminating the discharge of effluent from the reactor 10 to the reactor 14. Likewise, valve 19 is closed as is valve 22, so that reactor 14 no longer discharges its effluent into the outflow line 23.

Concurrently with this action, valve 15 is opened so that the effluent is pumped by means of pump 12 into the reactor 14. The discharge effluent from the reactor 14 passing through the line 21 then goes through valve 26 which is also opened at this time. The pump 18 thereupon pumps the discharge from the reactor 14 through a now open valve 27 into the reactor 10 so that the flow is reversed. Simultaneously, a valve 28 in the discharge line of the reactor 10 opens so that the effluent can then pass from reactor 10 through the pump 24 into the outflow line 23.

After the reverse of the flow, the relatively starved microorganisms in the new lead reactor 14 will enter into a growth phase and the solids accumulated in the new follow reactor 10 will enter into a decay phase.

There is also provision for transferring solids selectively between the reactor 10 and the reactor 14, independently of the flow of wastewater. To accomplish this, there is provided a pump 38 between the reactor 10 and the reactor 14. To transfer solids from reactor 10 to reactor 14, there is provided a line 29 under the control of a solenoid operated valve 30 operating in conjunction with a line 39 and a valve 31 at the discharge end of the pump 38 so that when both valves are open, the pump 38 delivers solids from the reactor 10 to the reactor 14. Transfer of solids from reactor 10 to reactor 14 has the same effect as reversing the wastewater influent from reactor 10 to reactor 14, that is, biological solids grown in the lead reactor, reactor 10 in this case, are contacted with the effluent from reactor 10 in the negative growth environment in reactor 14.

When solenoid operated valves 30 and 31 are open, an additional pair of solenoid operated valves 32 and 33 are closed. When the transfer of solids is to occur from reactor 14 to reactor 10, valves 30 and 31 are closed and valves 32 and 33 are open, so that the pump 28 delivers the solids from the second reactor 14 to the first reactor 10.

A key feature of the process is that the solids level in the follow reactor must be greater than could be accumulated by growth in this stage if it were only used as a second stage of a two-stage system.

The net effect of this cyclic multi-stage operation is to provide a much greater substrate removal efficiency that is possible in a single stage unit and a much lower net production of biological solids or sludge which must be removed for disposal or further treatment. Additionally, these benefits can be achieved when operating the two stages at volumetric loadings (waste load per unit volume) equal to or greater than that to a single stage unit. The following table reports results of cyclic, two stage operation of two anaerobic filters as compared to the performance when operating in a single stage mode.

TABLE 1

| System Loading (kg COD/ cu m/day) | Staging (Unit Load) | Influent Substrate Concentration (mg/L) | Effluent Concentration (mg/L) | Efficiency |
| --- | --- | --- | --- | --- |
| 4 | Single (4) | 6,000 | 400 | 93% |
| 4 | Lead (8) | 6,000 | 700 | 88% |
|   | Follow (1) | 700 | 60 | 95/99% |
| 8 | Single (8) | 6,000 | 700 | 88% |
| 8 | Lead (16) | 6,000 | 900 | 85% |
|   | Follow (2) | 900 | 120 | 87/98% |

While the system described includes only two reactors, multiple stages can be used with each stage providing unique and beneficial growth and substrate removal characteristics.

There are at least two distinguishing features of the new process. First, at least one of the units in series must contain accumulated solids from an earlier growth phase, from within or without the system, that are allowed to enter a negative growth phase so that the solids mass in that reactor is reduced while substrate removal continues to take place. Second, the contact of waste and microorganisms must be changed intermittently so that growth and decay phases alternate. This second criterion can be met by periodically alternating the staging of the reactors or by intermittently transferring biological solids from the lead unit to the follow unit.

The above description shows reactors operated in a manner similar to that of upflow anaerobic filters. However, the process of the invention can be operated with any biological process that provides for independent separation of biological solids for each stage.

It will be evident that various modifications can be made to the described embodiments without departing from the scope of the present invention and that the method and apparatus are applicable to aerobic biological treatment processes as well as anaerobic biological treatment processes.

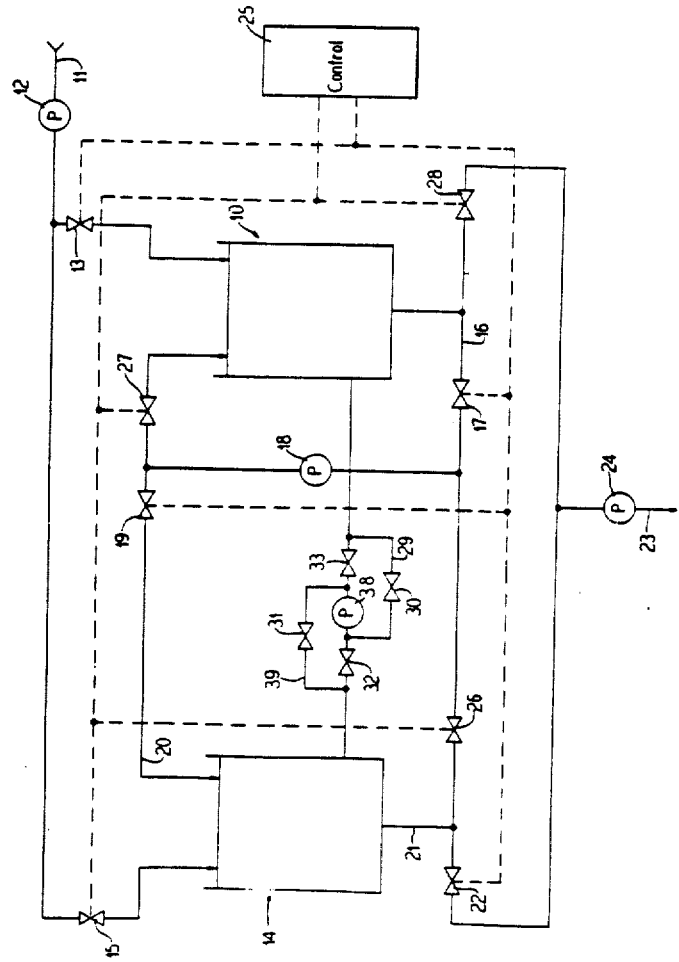

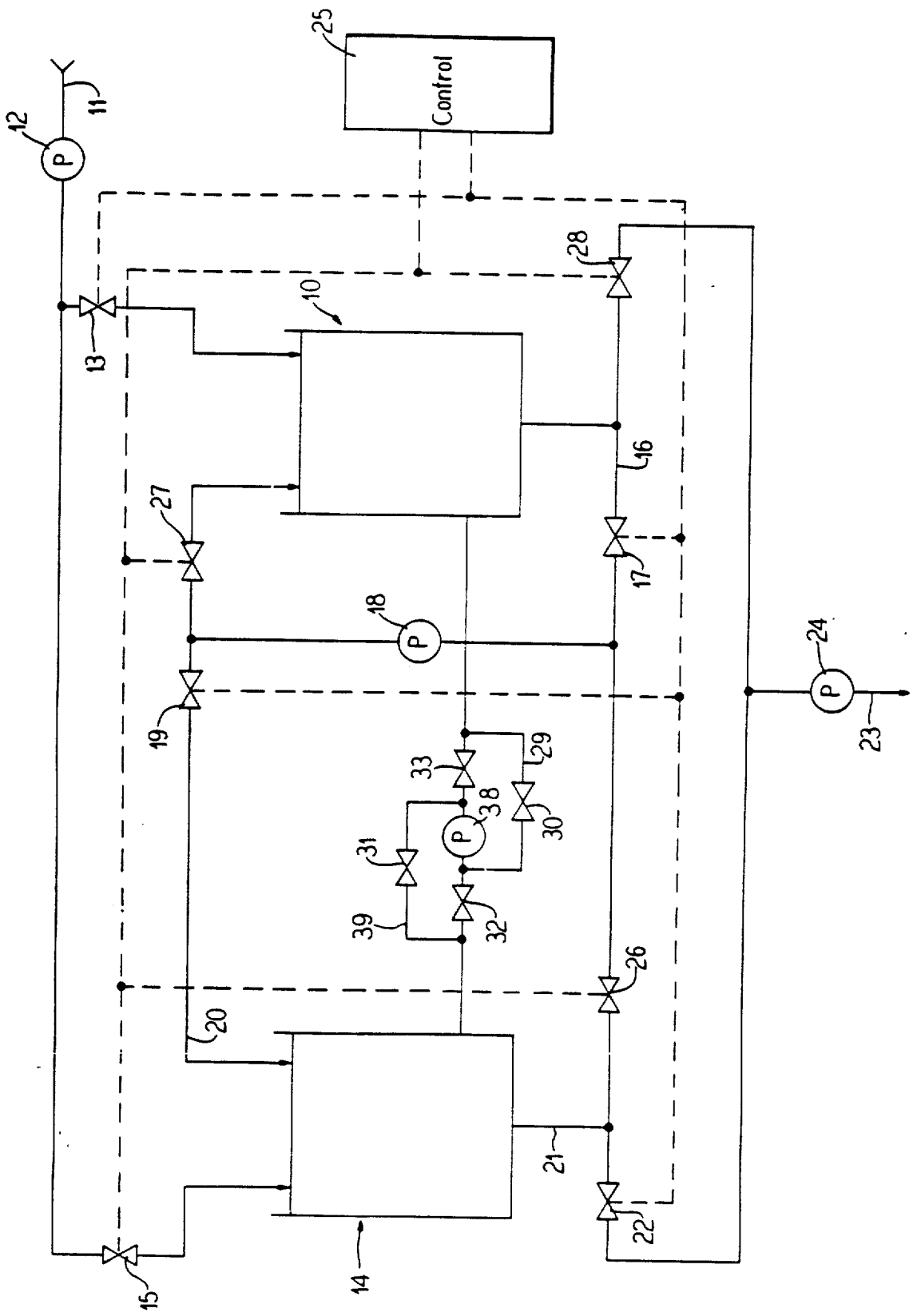

I claim as my invention:

1. A process of biological waste treatment in multiple stages which comprises:

distributing suitable amounts of biological solids during start up in a first and second reactor, introducing relatively high strength waste into said first biological reactor in which microorganisms are in a net growth phase to thereby produce an excess of biological solids and an effluent of reduced strength, passing said effluent into said second biological reactor, wherein the biological solids in said second reactor exist in a negative growth phase, thereafter reversing the flow of waste through said reactors by terminating introduction of said waste into said first reactor and passing the same into said second reactor to cause microorganisms in said second reactor to enter into a positive growth phase and the microorganisms in said first reactor to enter a negative growth phase, the biological reaction remaining the same in both stages in either direction of flow.

2. A process according to claim 1, which includes the step of transferring biological solids from the first of said reactors in the flow path to the other intermittently independently of the wastewater flow path.

3. A process according to claim 1, wherein the step of distributing the biological solids is conducted in parallel.

4. A process of biological waste treatment according to claim 1 wherein said treatment is anaerobic.

5. A process of biological waste treatment according to claim 1 wherein said treatment is aerobic.

6. A process as defined in claim 1 wherein the distribution of suitable amounts of biological solids during start up is a distribution of substantially equal amounts.

7. A process as defined in claim 1 wherein the distribution of suitable amounts of biological solids during start up is a distribution of substantially unequal amounts ranging between equal proportions to a distributional proportion of 90% in either reactor and 10% in the other reactor, and any distributional proportion intermediate thereto.

* * * * *

UNITED STATES PATENT AND TRADEMARK OFFICE
CERTIFICATE OF CORRECTION

PATENT NO. : 4,975,196   Page 1 of 3
DATED     : Dec. 4, 1990
INVENTOR(S) : James C. Young It is certified that error appears in the above-identified patent and that said Letters Patent is hereby corrected as shown below:

The title page should be deleted to appear as per attached title page.

Figure 1 should be inserted as part of Letters Patent as shown on the attached sheet.

Signed and Sealed this

Fourth Day of January, 1994

*Attest:*

BRUCE LEHMAN

*Attesting Officer*   *Commissioner of Patents and Trademarks*

United States Patent [19]

Young

[11] Patent Number: 4,975,196

[45] Date of Patent: Dec. 4, 1990

[54] CYCLIC, MULTI-STAGE BIOLOGICAL PROCESS FOR WASTEWATER TREATMENT

[75] Inventor: James C. Young, Fayetteville, Ark.

[73] Assignee: Board of Trustees of the University of Arkansas, Little Rock, Ark.

[21] Appl. No.: 509,369

[22] Filed: Apr. 16, 1990

Related U.S. Application Data

[63] Continuation-in-part of Ser. No. 17,453, Feb. 24, 1987, abandoned, and a continuation of Ser. No. 273,625, Nov. 17, 1988, abandoned.

[51] Int. Cl.⁵ ............................................. C02F 3/30
[52] U.S. Cl. ........................... 210/617; 210/614; 210/620; 210/142; 210/201
[58] Field of Search ............. 210/607, 614, 617, 620, 210/630, 903, 142, 199, 201, 253, 254

[56] References Cited

U.S. PATENT DOCUMENTS

| | | | |
|---|---|---|---|
| 3,442,386 | 5/1969 | Malm et al. | 210/142 |
| 3,497,066 | 2/1970 | Nicol | 210/220 |
| 3,524,547 | 8/1970 | Nicol | 210/220 |
| 3,977,965 | 8/1976 | Tholander et al. | 210/630 |
| 4,179,366 | 12/1979 | Kaelin | 210/620 |
| 4,624,788 | 11/1986 | Repin | 210/607 |

*Primary Examiner*—Tom Wyse
*Attorney, Agent, or Firm*—Hermann Ivester

[57] ABSTRACT

A method for anaerobic biological waste treatment in multiple stages wherein a relatively high strength wastewater is introduced into a first biological reactor to produce an effluent of reduced strength, the effluent is passed into a second biological reactor for reaction therein, passage of the effluent into the second biological reactor is continued until the biological solids in the second reactor enter into a negative growth phase and become relatively stable, whereupon the flow of waste through the reactors is reversed by terminating introduction of the waste into the first reactor and passing the same into the second reactor to cause microorganisms in the second reactor to enter into a positive growth phase and the solids in the first reactor to enter into a negative growth phase.

7 Claims, No Drawings